(12) United States Patent
Kassar et al.

(10) Patent No.: US 12,515,654 B2
(45) Date of Patent: Jan. 6, 2026

(54) COUNTER-STEERING PENALIZATION DURING VEHICLE TURNS

(71) Applicant: FORD GLOBAL TECHNOLOGIES, LLC, Dearborn, MI (US)

(72) Inventors: Alice Kassar, Dearborn Heights, MI (US); Scott Julian Varnhagen, Ann Arbor, MI (US); Ramadev Burigsay Hukkeri, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 802 days.

(21) Appl. No.: 17/222,015

(22) Filed: Apr. 5, 2021

(65) Prior Publication Data
US 2022/0314983 A1   Oct. 6, 2022

(51) Int. Cl.
*B60W 30/12*    (2020.01)
*B60W 60/00*    (2020.01)
*G01S 19/42*    (2010.01)

(52) U.S. Cl.
CPC .......... *B60W 30/12* (2013.01); *B60W 60/001* (2020.02); *G01S 19/42* (2013.01); *B60W 2552/53* (2020.02)

(58) Field of Classification Search
None
See application file for complete search history.

(56) References Cited

U.S. PATENT DOCUMENTS

| | | |
|---|---|---|
| 10,831,210 B1 | 11/2020 | Kobilarov |
| 2004/0040781 A1* | 3/2004 | Fujioka ................ B62D 5/0466 180/446 |
| 2007/0184929 A1 | 8/2007 | Piyabongkarn et al. |
| 2017/0129535 A1* | 5/2017 | You ........................ B62D 6/002 |
| 2017/0364083 A1 | 12/2017 | Yang et al. |
| 2018/0253098 A1 | 9/2018 | Borinato |
| 2018/0281191 A1 | 10/2018 | Sinyavskiy et al. |
| 2018/0293449 A1 | 10/2018 | Sathyanarayana et al. |
| 2019/0005412 A1 | 1/2019 | Matus et al. |
| 2019/0107840 A1 | 4/2019 | Green et al. |
| 2019/0113929 A1 | 4/2019 | Mukadam et al. |

(Continued)

FOREIGN PATENT DOCUMENTS

WO   2020062033 A1   4/2020

OTHER PUBLICATIONS

International Search Report of PCT/US2022/023383 mailed Jul. 15, 2022, 3 pages.

(Continued)

*Primary Examiner* — Fadey S. Jabr
*Assistant Examiner* — Mario C Gonzalez
(74) *Attorney, Agent, or Firm* — Brooks Kushman P.C.

(57) ABSTRACT

Devices, systems, and methods are provided for counter-steering penalization. A device may analyze, by one or more processors, lane geometry associated with one or more lanes at a geographic location. The device may identify one or more corners in the lane geometry. The device may select one or more desired maximum steering angles of a steering wheel of an autonomous vehicle. The device may select weight values associated with the one or more desired maximum steering angles. The device may execute a path planning optimization based on the one or more desired maximum steering angles and the weight values.

20 Claims, 7 Drawing Sheets

(56) References Cited

U.S. PATENT DOCUMENTS

| | | | |
|---|---|---|---|
| 2019/0113931 | A1 | 4/2019 | Zha et al. |
| 2019/0299978 | A1 | 10/2019 | Balakrishnan et al. |
| 2019/0299983 | A1 | 10/2019 | Shalev-Shwartz et al. |
| 2019/0324463 | A1 | 10/2019 | Zhu |
| 2020/0001862 | A1 | 1/2020 | Luo et al. |
| 2020/0159225 | A1 | 5/2020 | Zeng et al. |
| 2020/0207368 | A1 | 7/2020 | Takagi |
| 2020/0371518 | A1 | 11/2020 | Kang |
| 2021/0070360 | A1 | 3/2021 | Lee et al. |
| 2021/0078592 | A1* | 3/2021 | Febbo ............... G06V 20/58 |
| 2022/0009522 | A1* | 1/2022 | Zhang ............... B62D 15/025 |
| 2022/0063610 | A1* | 3/2022 | Hafner ............... B60W 30/09 |

OTHER PUBLICATIONS

Written Opinion of PCT/US2022/023383 mailed Jul. 15, 2022, 5 pages.
Cornet, R. "Safe Reinforcement Learning for Automated Vehicles", Master of Science Thesis, Aug. 14, 2020, pp. 1-118, Delft University of Technology, Delft, Netherlands.
Nolte et al. "Model Predictive Control Based Trajectory Generation for Autonomous Vehicles—An Architectural Approach", IEEE Intelligent Vehicles Symposium 2017, Aug. 10, 2017, pp. 1-8, IEEE, New York, NY.
Wolf et al. "Learning How to Drive in a Real World Simulation with Deep Q-Networks", 2017 IEEE Intelligent Vehicles Symposium, Jun. 2017, pp. 1-8, IEEE, New York, NY.
B. Guenmn et. al., A Gentle Introduction to Optimization 1 (Cambridge University Press, 2014).

\* cited by examiner

US 12,515,654 B2

COUNTER-STEERING PENALIZATION DURING VEHICLE TURNS

TECHNICAL FIELD

This disclosure generally relates to systems and methods for counter-steering penalization during vehicle turns.

BACKGROUND

Autonomous vehicles are equipped with sensors to collect data relating to the current and developing state of the vehicle's surroundings. Sensors may be located at various positions on an autonomous vehicle. These sensors may assist the autonomous vehicle during real-world operation, such as navigating roads and maneuvering around objects that may be found along the path from a starting point to a destination.

Figure 1:
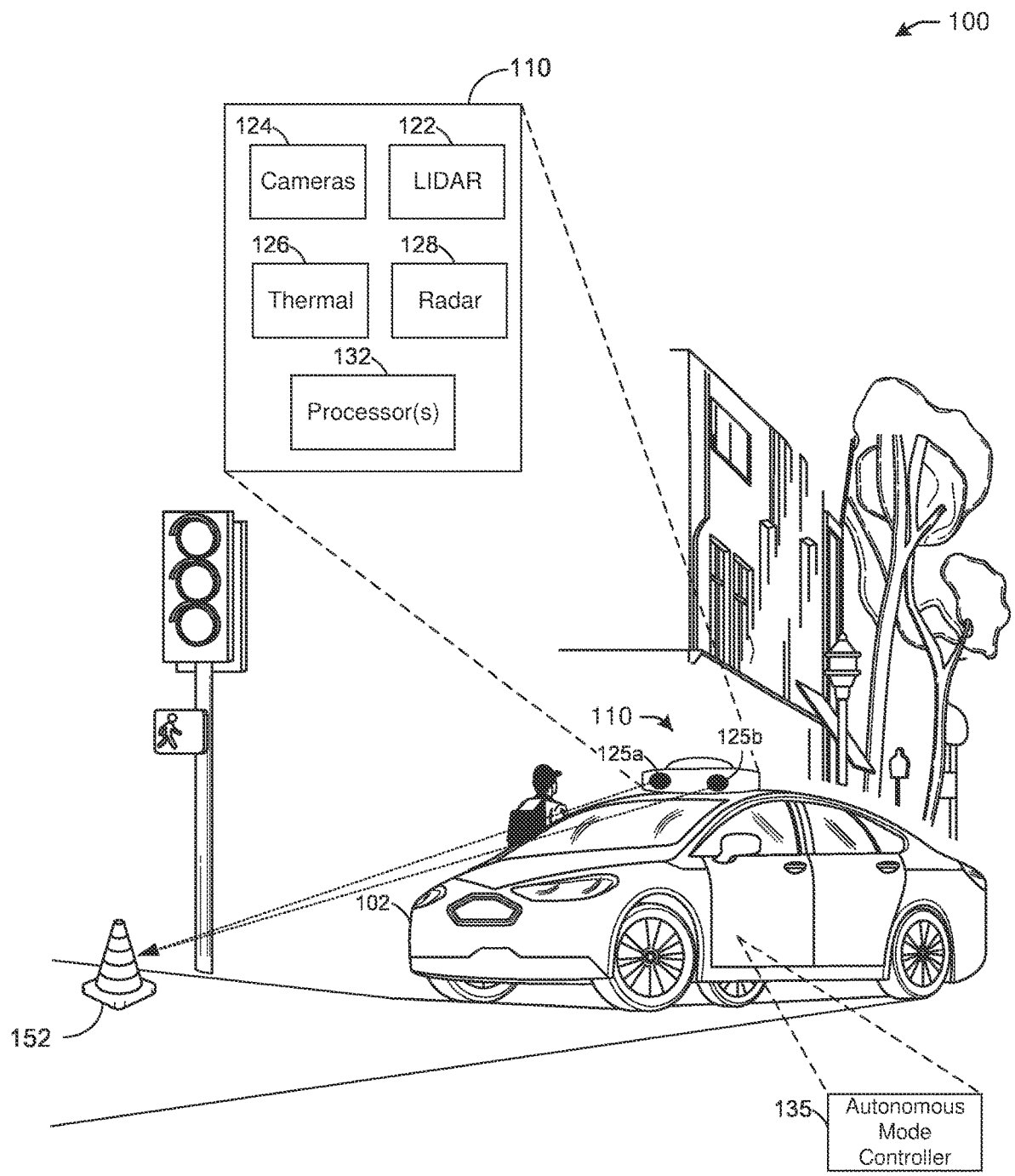
FIG. 1 illustrates an example environment of a vehicle, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Sensors may be located at various positions on an autonomous vehicle. These sensors may include light detection and ranging (LIDAR) sensors, stereo cameras, radar sensors, thermal sensors, or other sensors attached to an autonomous vehicle. These sensors may assist a vehicle during real-world operations, such as navigating roads and maneuvering around objects that may be found along the path from a starting point to a destination. The autonomous vehicle may analyze the geometry of the roads to determine how to properly navigate on these roads.

When an autonomous vehicle approaches a corner, it may swing out in one direction before traversing the corner in the opposite direction. This is because the autonomous vehicle software attempts to optimize the path taken through corners to have minimal lateral acceleration and to require minimal steering effort. One way to achieve this is to attempt to traverse a curve using a larger turning radius (the large turning radius minimizes lateral acceleration with respect to speed). However, turning away from the corner in order to increase its radius would feel unnatural from a driver's perspective or a passenger's perspective. That is, to achieve this larger radius, the autonomous vehicle software may plan a path which first swings wide prior to turning the corner. As a result of such a path, the autonomous vehicle tends to steer in the opposite direction of the turn (or counter-steers) then transitions into steering in the same direction of the turn. This behavior will be generally described as a "trucker turn" throughout this disclosure, referencing how a truck driver would have to traverse a tight corner in a large vehicle, such as a commercial truck. Counter-steering before turning is not how a human driver would intuitively navigate a turn. In these cases, the autonomous vehicle behavior may be interpreted as un-naturalistic to human passengers. When performing a trucker turn, counter-steering will make the autonomous vehicle point towards out-of-lane traffic at an unnatural and uncomfortable angle. This may make the driver and passengers feel uncomfortable, especially if there is oncoming traffic because the vehicle would orient itself at an uncomfortable and unnatural angle before traversing the corner. Therefore, there is a need for better path planning when turning right or left on a road.

Example embodiments described herein provide certain systems, methods, and devices for counter-steering penalization.

For motion planning, receding motion planning is performed by receding horizon control where a self-driving system determines where the vehicle will be in the next few seconds and solves an optimization problem to determine the sequence of actions that need to be performed to optimally achieve an objective. This optimization may comprise avoiding obstacles, staying in the driving lane, etc., while trying to do so with smooth steering (e.g., by not moving the steering wheel too quickly). However, such optimization may cause the vehicle to swing wider than necessary before turning into a corner, also making the turn radius greater than necessary. In practice, such a wide turn may be similar to a race car traversing a corner on a race track or a large commercial truck traversing a corner on a standard road. This style of traversing a corner may feel unnatural to a person inside the vehicle.

In one or more embodiments, a counter-steering penalization system may penalize such optimization by applying certain weight values to either left or right steering angles to control the degree to which a self-driving vehicle swings wide before the vehicle traverses a corner. In other words, a counter-steering penalization system may penalize movement in an opposite direction of a corner to minimize over steering before traversing a corner.

In one or more embodiments, a counter-steering penalization system may perform an analysis on the geometry of the road, to determine if there is a corner or not. If it is determined that there is a geometry that represents a corner on the road, a counter-steering penalization system may calculate the time interval before the corner where penalization of steering wheel angle may be implemented.

In one or more embodiments, a counter-steering penalization system may determine a penalization of steering wheel angle off-board using, for example, a graph of driving lane geometry. In other examples, such a penalization may be determined on-board while the vehicle is traveling on a road based on data from one or more cameras on the vehicle, along with monitoring the degree of road curvature.

In one or more embodiments, a counter-steering penalization system may define a region where the vehicle will traverse a corner. Within that region, a counter-steering penalization system may determine how to penalize a maximum allowed steering wheel angle. Two variables may be modified due to the penalization, one is the maximum allowed left steering wheel angle, and the other is the maximum allowed right steering wheel angle. In that sense, if the corner is to the right, a counter-steering penalization system may penalize the maximum allowed left steering wheel angle to limit left steering before the vehicle enters the right corner. The same applies if the corner is a left corner, where the counter-steering penalization system may penalize the maximum allowed right steering angle to limit right steering before the left corner.

In one or more embodiments, a counter-steering penalization system may apply weight values to penalize right steering or left steering. For example, and application of greater weight values results in a higher degree of steering penalization in the left or right direction as applicable. Conversely, setting the weight values to 0 results in no penalization of steering in the left or right direction. The determination of a weight value may depend, at least in part, on any obstacles around the corner. For example, if there is a car is positioned near an inside portion of the turn, a driver might perform a trucker turn before it traverses the corner in order to create sufficient spacing to the car positioned in the turn. Therefore, the variation of penalization right or left turns using the weight values may depend, at least in part, on what obstacles, if any, exist in the region where the counter-steering penalization system is determining the optimization of the vehicle's path through the corner.

In an optimization problem approach, an objective may be selected, where a cost function may need to be minimized subject to constraints on decision variables. In one or more embodiments, a counter-steering penalization system may determine decision variables that are based on the amount of steering and the optimal steering angle. It may not be desirable to have a hard constraint where the constraint is "less than a maximum steering angle," because if the maximum steering angle is set to zero, this would mean that the steering angle would never be greater than zero. In this example, the optimization problem could not exceed the hard constraint maximum value (e.g., 0). However, if the vehicle that implements such a hard constraint, it may limit the self-driving system's ability to improvise (e.g., to avoid an obstacle positioned within or near the curve). That is, implementing impromptu avoidance may be limited considering a hard constraint in the optimization problem.

In one or more embodiments, a counter-steering penalization system may facilitate the use of a slack variable. The slack variable allows the slacking of a constraint. That is, instead of having the constraint of "steering angle less than max steering angle," the use of a slack variable may result in that the "steering angle less than max steering angle plus some slack variable." Hence, there is a possibility that the slack variable could be larger than zero, which would result from a steering angle being in violation of the desired max steering angle x. The optimization problem penalizes the slack variable being greater than zero (e.g., attempts to achieve the constraint on steering wheel angle) as an optimization objective. With the slackened constraints of desired maximum steering wheel angle, the optimization problem is able to consider the objective of penalizing counter-steer among other objectives. For example, if the autonomous vehicle determined that a parked car exists in its path prior to entering a corner, the self-driving system would be able to override the counter-steering penalization objective (via this slackening mechanism) to provide adequate spacing to the parked car. In one or more embodiments, a counter-steering penalization system may be based on an offline map that is a graph of lanes connected to each other depicting road curvature. This provides a preview of how a corner should be optimally taken while minimizing or otherwise eliminating counter-steer. Additionally or alternatively, the counter-steering penalization system may utilize data from cameras and sensors mounted on the vehicle while navigating a road. That is, these cameras and sensors may provide data to the counter-steering penalization system to determine how the vehicle should best navigate a corner in order to adapt as appropriate to any obstacle or changes that may not have been readily available from the offline map. In this way, features of the counter-steering penalization system may be implemented globally and account for roads across various countries and cities based on existing maps that provide road geometry, such that the features are applied to prevent undesirable steering around corners.

Throughout this disclosure, a positive steering wheel angle means steering to the left and a negative steering wheel angle means steering to the right. Penalizing steering in an opposite direction of a turn improves the trucker turn problem, however, it does not resolve it for all cases. For some turns, the autonomous vehicle ("AV") aligns itself with a small heading offset before entering a corner. Then, while entering the corner, the AV may exhibit similar trucker turn behavior, but without the AV steering in the opposite direction of the turn). In this example, the trucker turn may be caused by the vehicle orientation related to the heading offset leading into the turn. Aspects of the present disclosure provide advanced techniques to control the orientation of the AV before the turn. One example method used includes calculating the desired orientation values based on the road geometry. In some examples, calculations for a desired orientation are derived from a fusion of the reference path and geometry of lane markings. Controlling the desired steering wheel angle as well as the vehicle orientation improves mitigating unnecessarily wide turns.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates example environment 100 of a vehicle 102, in accordance with one or more example embodiments of the present disclosure.

The modern automobile may have many electronic control units (ECUs) for various subsystems. Some of these subsystems may be used to provide proper operation of the vehicle. Some examples of these subsystems may include a braking subsystem, a cruise control subsystem, power windows, and doors subsystem, battery charging subsystem for hybrid and electric vehicles, or other vehicle subsystems. Communication between the various subsystems is an important feature of operating vehicles. A controller area network (CAN) bus may be used to allow the subsystems to communicate with each other. Such communications provide a wide range of safety, economic, and convenience features to be implemented using software. For example, sensor inputs from the various sensors around the vehicle may be communicated between the various ECUs of the vehicle via the CAN bus to perform actions that may be essential to the performance of the vehicle. An example may include auto lane assist and/or avoidance systems where such sensor inputs are used by the CAN bus to communicate these inputs to the driver-assist system, such as lane departure warning, which in some situations may actuate breaking active avoidance systems.

Referring to FIG. 1, there is shown a vehicle 102 comprising a sensor system 110 for a plurality of cameras, emitters, and sensors. The sensor system 110 may be connected to the vehicle 102 (e.g., on top of the vehicle 102, as shown). In this environment 100, there is shown that sensor system 110 includes cameras such as stereo cameras 125a and 125b. The stereo cameras 125a and 125b may capture images of objects (e.g., object 152) in the vicinity and around the vehicle 102. Other emitters and sensors in the sensor system 110 may transmit and/or receive one or more signals in order to detect and/or capture information associated with objects in the vicinity and around the vehicle 102. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 110 may include LIDAR 122. Some examples of a LIDAR such as Geiger mode LIDAR, ground-based LIDAR, large footprint LIDAR, small footprint LIDAR, or the like. The sensor system 110 may include cameras 124, such as stereo cameras that may capture images in the vicinity of the vehicle 102. The sensor system 110 may include a thermal sensor 126, such as thermistors, resistance temperature detectors, thermocouples, semiconductors, or the like. Further, the sensor system may include a radar 128, which may be any radar that uses radio waves to capture data from objects surrounding the vehicle 102. The sensor system 110 may also include one or more processor(s) 132. The vehicle 102 may comprise an autonomous mode controller 135. The one or more processor(s) 132 may control the transmission and reception of signals using the LIDAR 122, the cameras 124, the thermal sensor 126, and the radar 128. The various sensors of the sensor system 110, when calibrated correctly, should indicate a proper distance and shape of object 152.

The autonomous mode controller 135 may perform an analysis on the shape of the road, to determine if there is a corner or not. If it is determined that there is a geometry that describes a corner on the road, the autonomous mode controller 135 may calculate the interval before the corner where penalization of steering wheel angle may be implemented. The autonomous mode controller 135 may determine a penalization of steering wheel angle off-board using, for example, a graph of lane geometry or may be determined on-board while the vehicle is traveling on a road based on one or more cameras on the vehicle and monitoring curvatures on the road. The autonomous mode controller 135 may define a region where the vehicle will traverse the corner. Within that region, the autonomous mode controller 135 may determine how to penalize a maximum allowed steering wheel angle.

It is understood that the above descriptions are for purposes of illustration and are not meant to be limiting.

Figure 2:
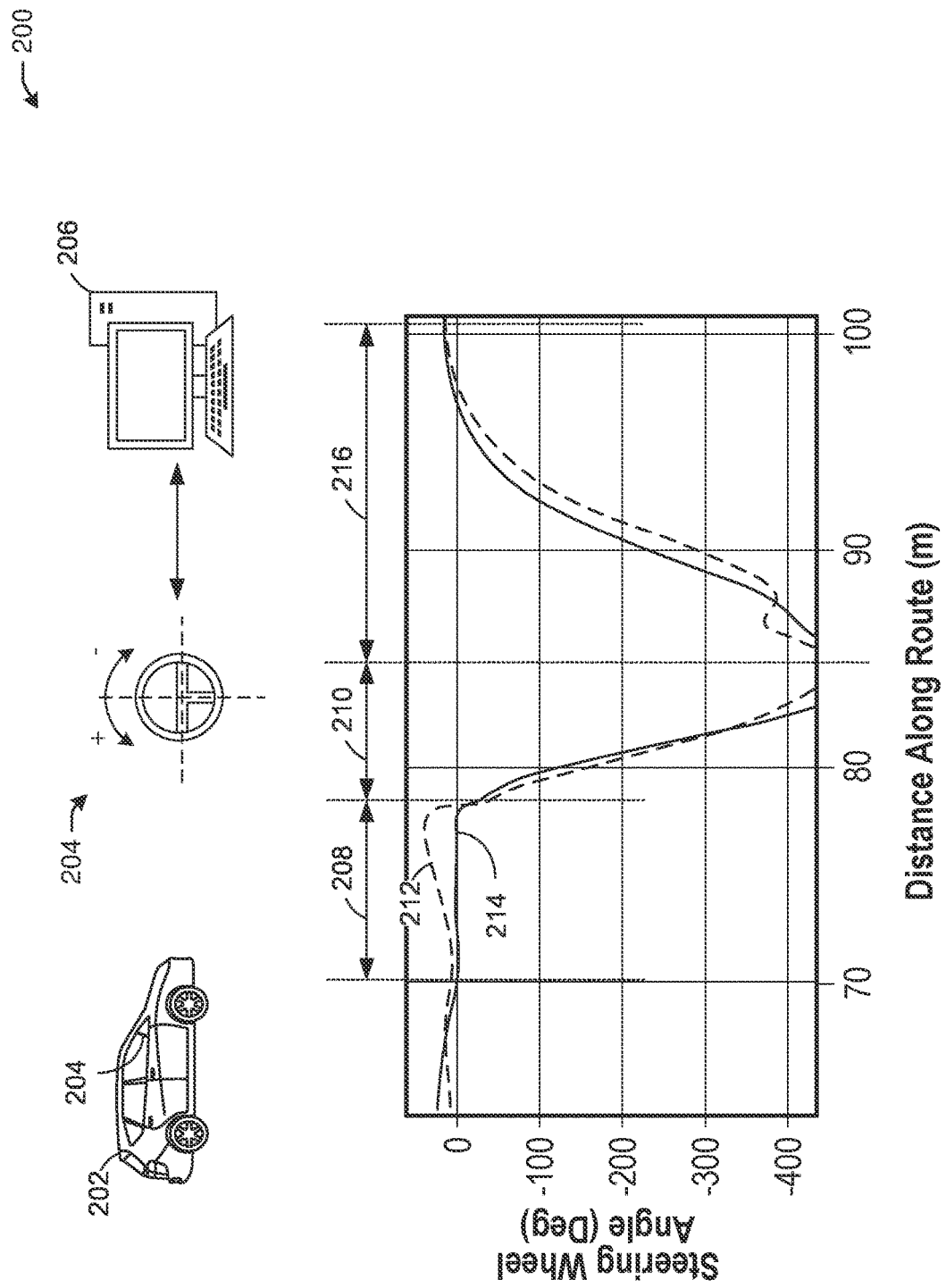
FIG. 2 depicts an illustrative schematic diagram for counter-steering penalization, in accordance with one or more example embodiments of the present disclosure.

FIG. 2 depicts an illustrative schematic diagram 200 for counter-steering penalization, in accordance with one or more example embodiments of the present disclosure.

Referring to FIG. 2, there is shown an autonomous vehicle 202 that comprises a steering wheel 204. The steering wheel 204 is capable of making right and left turns as the autonomous vehicle 202 progresses and navigates on a road. A vehicle path may be selected between a starting point and a destination point. The autonomous vehicle 202 may implement an algorithm that may evaluate one or more corners that the autonomous vehicle 202 may encounter on the selected path. A computer system 206 may perform offboard determination of these corners on the path between the starting point and the destination point. The computer system 206 may access an offline map that identifies possible corners that may be traversed by the autonomous vehicle 202. The offline map may be a graph of a series of connected lanes. These lanes may comprise one or more curvatures that the autonomous vehicle 202 may encounter while navigating a road. This offline map provides a snapshot of how a corner should be optimally traversed by a vehicle while minimizing or otherwise eliminating counter-steer performed by the vehicle. Although the computer system 206 may have already evaluated corners that the autonomous vehicle 202 will encounter using the offline map, it is not a necessary step. The autonomous vehicle 202 may have the capability of performing this evaluation as it navigates the road. The autonomous vehicle 202 may employ cameras and sensors mounted on the autonomous vehicle 202 to detect the paths and turns that may be encountered as the autonomous vehicle 202 navigates a road. These cameras and sensors may collect data that may be used by the autonomous vehicle 202 to evaluate how a corner may be traversed and adapt to any obstacles that may be in the path of the autonomous vehicle 202.

The convention used throughout this disclosure is that a positive steering wheel angle indicates a left corner, and a negative steering wheel angle indicates a right corner. For example, when steering wheel 204 is turned to the left, a positive steering wheel angle in degrees may be represented on a plot. When the steering wheel 204 is turned to the right, a negative steering wheel angle in degrees may be represented on the plot.

Referring to in FIG. 2, there are shown two plots as the autonomous vehicle 202 traverses a road. The X-axis represents distance along the road in meters and the Y-axis represents the steering wheel angle in degrees. The first plot 212 represents the result of the autonomous vehicle 202 traversing the road without applying counter-steering penalization and the second plot 214 represents the result of the autonomous vehicle 202 traversing the road while applying counter-steering penalization. As can be seen by looking in region 208, while the autonomous vehicle 202 is planning to traverse a right turn, a positive steering angle is shown, indicating that the steering wheel 204 has turned to the left before the right turn. However, applying counter-steering penalization results in maintain the steering wheel angle at zero, which indicates that the steering wheel does not turn left before the right turn.

Region 210 shows a negative steering wheel angle (e.g., turning the steering wheel to the right). Region 216 shows that the steering wheel straightening after taking the right turn. It is understood that the above descriptions are for purposes of illustration and are not meant to be limiting.

Figure 3:
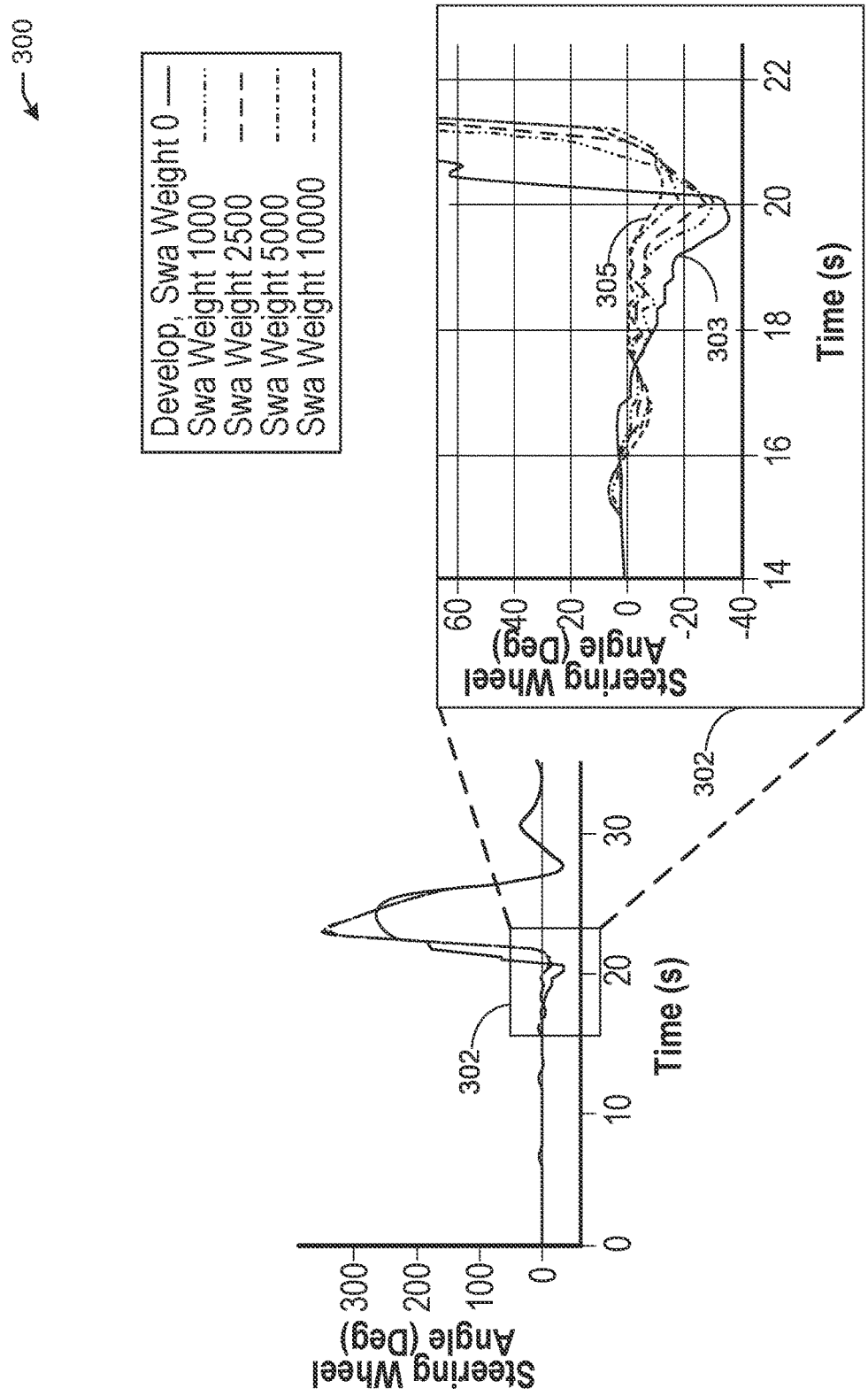
FIG. 3 depicts an illustrative schematic diagram for counter-steering penalization, in accordance with one or more example embodiments of the present disclosure.

FIG. 3 depicts an illustrative schematic diagram 300 for counter-steering penalization, in accordance with one or more example embodiments of the present disclosure.

Referring to FIG. 3, there is shown a steering wheel angle plot that may be generated based on an autonomous vehicle traversing a road. Region 302 of this plot is shown in an exploded view in order to observe the various plots that may be generated by applying one or more steering wheel angles (SWA) weights. In region 302, the autonomous vehicle may be traversing a left turn. As explained above, a counter-steering penalization system may penalize, in the path planning optimization problem, steering in the opposite direction of a turn for a distance before the turn. As a vehicle approaches a turn, a time interval may be selected in which counter-steering may be penalized. This time interval may begin at some adjustable value ahead of the turn and ends inside the turn. The time interval duration may be affected by the geometry of the path leading to it or the speed of the autonomous vehicle.

In one or more embodiments, the optimization problem may be augmented to contain two additional slack variables; one to penalize left steering wheel angles and another to penalize right steering wheel angles. For example, when the turn is a left turn, the right steering wheel angle slack variable value may be set to zero to penalize steering in the right angle direction. In that case, the left steering wheel angle slack variable may be set to the maximum steering wheel angle the vehicle can achieve given its speed.

In the example, where the turn is a right turn, the left steering wheel angle slack variable value may be set to zero to penalize x steering in the left angle direction. In that case, the right steering wheel angle slack variable may be set to the maximum steering wheel angle the vehicle can achieve given its speed. Each slack variable may have a weight associated with it. Changing the weights may control penalizing steering in one direction independently of the other direction. A weight of zero implies no penalty, whereas a high weight implies a large penalty. Having the ability to reduce the weight is important in situations where counter-steering may be expected. For example, if an obstacle is located inside a corner that may block the path of the AV, the AV may have to veer around the obstacle by counter-steering to gain lateral offset and avoid the obstacle.

The various plots of FIG. 3 show the results of applying various SWA weights on the steering slack variables in order to reduce unnecessarily wide turns. For example, a "baseline" state of the AV may have an SWA weight of 0. It is noted that baseline describes system performance with no counter-steering penalization employed. Other SWA weights used in FIG. 3 include 1000, 2500, 5000, or 10000. It should be understood that other SWA weights may be used and that the values used in FIG. 3 are only for illustrative purposes. Larger values imply larger penalization of counter-steer. In the example of FIG. 3, line 303 shows the baseline state, while line 305 shown the curvature of the vehicle when the SWA weight is set to 10000. It should be understood that these values are for illustrative purposes only, and other values may be used to show the impact of various steering wheel angle weights. These steering wheel angle values and weights are fed to the optimization problem. By limiting the steering wheel angle entering the corner with different SWA weights, it can be seen that increasing the weight causes a reduction in the counter-steering before the corner. In the example of FIG. 3, line 303 shows a larger steering wheel angle in degrees before a left turn.

The optimization problem solution may attempt to select a path that minimizes counter-steering using the SWA weights values. In some conditions where the AV may be approaching a tight turn and the AV steering wheel angle limits are too restrictive to navigate the corner, counter-steering penalization may be relaxed by applying slack values to help the AV navigate the corner successfully by planning a larger radius turn within its allowed steering limits. Penalizing counter-steering using slack variables, allows, in the problem definition, adjusting the steering limits. Therefore, in a situation where the AV cannot physically achieve a turn without counter-steering, the optimization problem solution may use slack variables to generate a feasible solution.

In an implementation example, a condition may be set for steer_angle is less than desired_max_steer_angle. This condition may not need to be rigidly enforced because, in some scenarios, it may be necessary to exceed this desired_max_steer_angle. Some of the scenarios may include executing a tighter turn, avoiding an obstacle, or any other scenario that requires the steer_angle to be greater than the desired_max_steer_angle.

A "Slack variable" S may be imposed such that in the formulation it is desired to minimize:
s_weight×$S^2$+<other objectives> such that:
steer_angle<desired_max_steer_angle+S
this way, it may be possible to control how aggressively the optimization problem seeks to achieve steer_angle<desired_max_steer_angle by adjusting the penalization weight s_weight.

It is understood that the above descriptions are for purposes of illustration and are not meant to be limiting.

Figure 4:
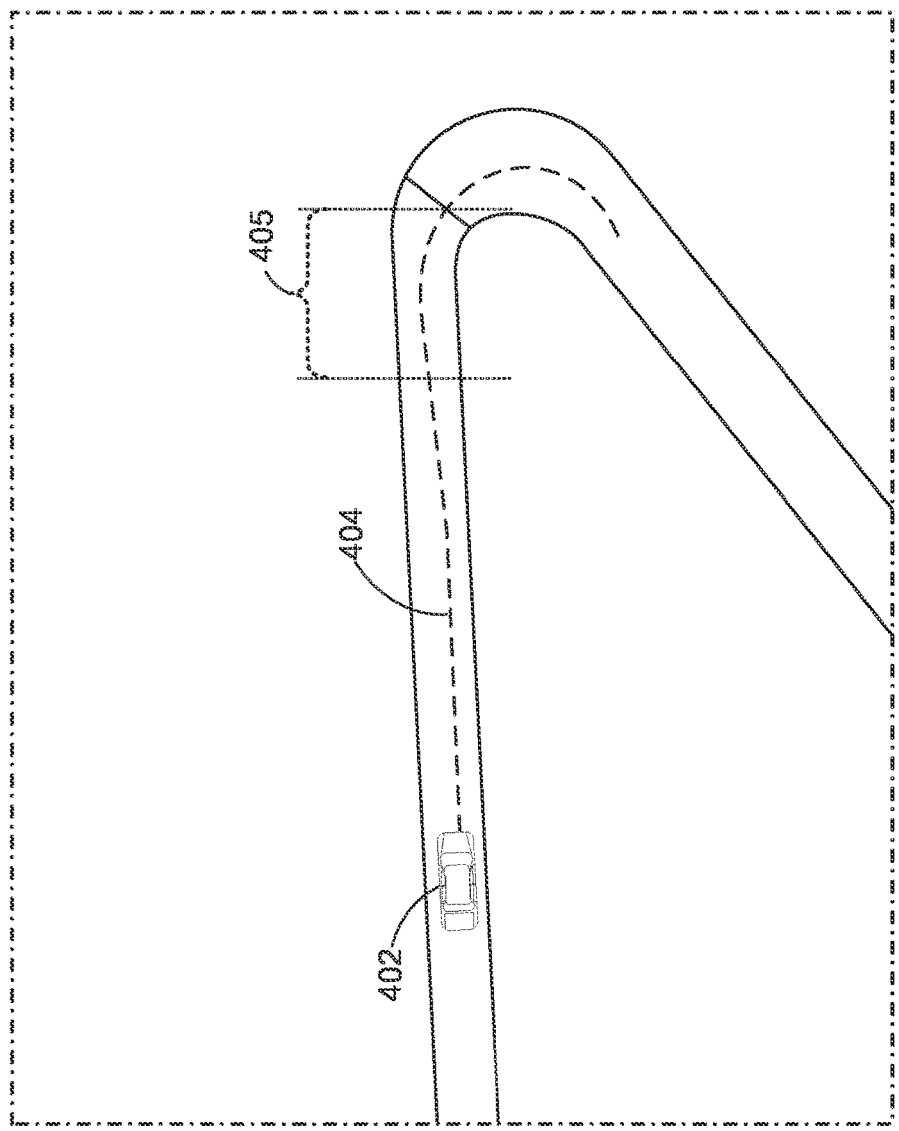
FIG. 4 depicts an illustrative schematic diagram for counter-steering penalization, in accordance with one or more example embodiments of the present disclosure.

FIG. 4 depicts an illustrative schematic diagram 400 for counter-steering penalization, in accordance with one or more example embodiments of the present disclosure.

Referring to FIG. 4, there is shown an autonomous vehicle 402 traveling on a road 403. The vehicle 402 is shown to be traversing a right turn. The autonomous vehicle 402 may be traveling in a path 404 on the road 403. The vehicle 402 may analyze the shape of the road to detect a geometry of the road including corners. If the analysis shows that a corner is coming up, the autonomous vehicle 402 may measure a time period 405 before the autonomous vehicle 402 reaches the corner, allowing the penalization of steering wheel angle to be applied. In some examples, the autonomous vehicle 402 may have performed a penalization of steering wheel angle off-board using an offline map of lane geometry. In some examples, the autonomous vehicle 402 may perform a penalization of steering wheel angle on-board based on one or more data received from one or more devices (e.g., cameras, radars, LIDARs, etc.) on the vehicle while the vehicle travels on the road 403. In the example of FIG. 4, the autonomous vehicle 402 is shown to be approaching a right turn. The autonomous vehicle 402 may apply weight values to penalize left steering in this case since the vehicle will be making a right turn after the time period 405. The result of the penalization is limiting left steering such that a passenger or a driver of the vehicle 402 may not feel that the turn is unnatural or uncomfortable.

It is understood that the above descriptions are for purposes of illustration and are not meant to be limiting.

Figure 5:
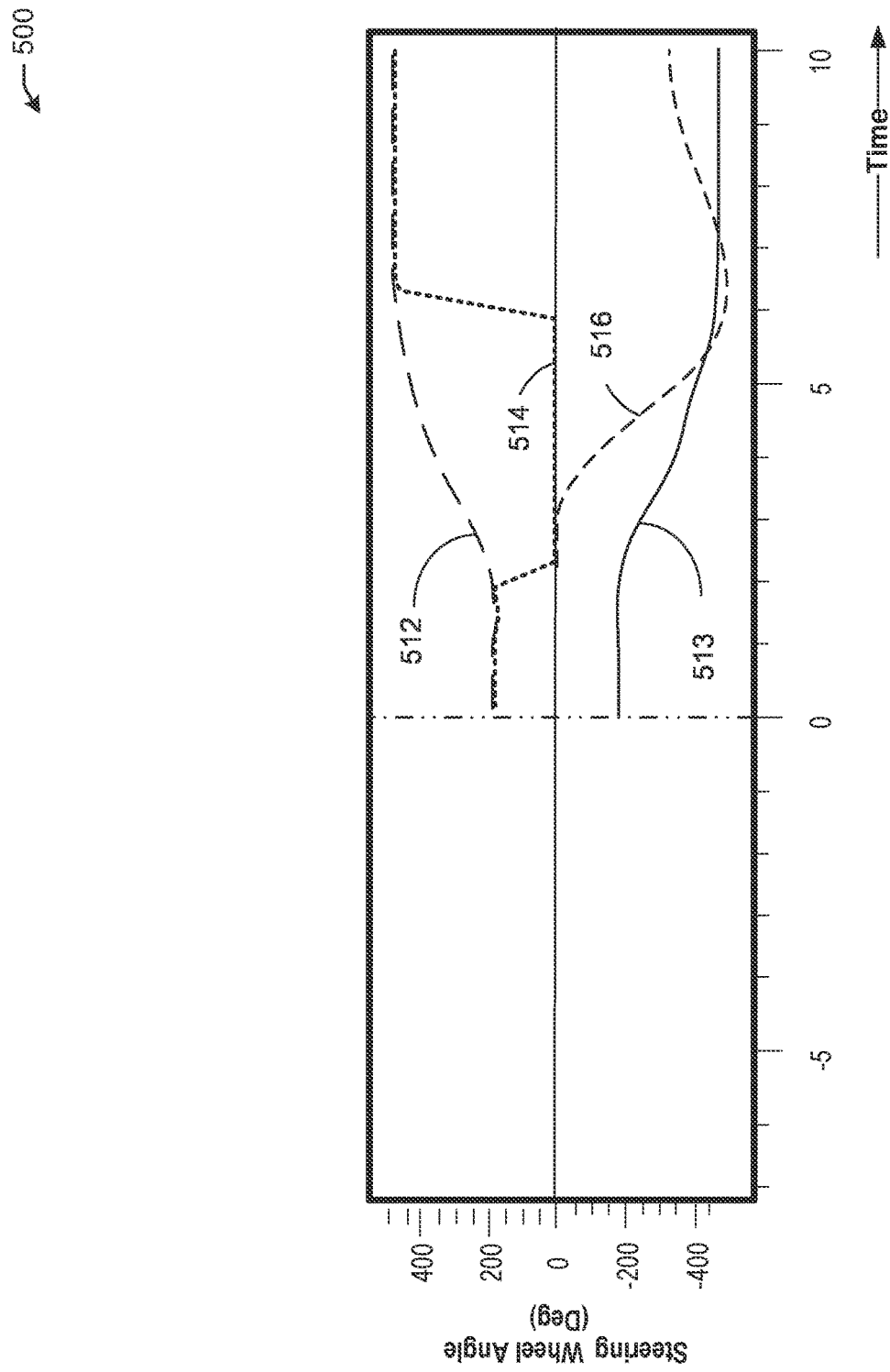
FIG. 5 depicts an illustrative schematic diagram for counter-steering penalization, in accordance with one or more example embodiments of the present disclosure.

FIG. 5 depicts an illustrative schematic diagram 500 for counter-steering penalization, in accordance with one or more example embodiments of the present disclosure.

Referring to FIG. 5, there is shown a steering wheel angle plot. The X-axis represents time in seconds, where negative values show past time intervals and positive values show future time intervals. The Y-axis represents the steering wheel angle in degrees based on whether the steering wheel is turned left or right. In this example, the plot illustrates a vehicle traversing a right corner. In this case, a counter-steering penalization may be applied to the left steering before the vehicle traverses the right turn.

Lines 512 and 513 show maximum steering wheel angles that the autonomous vehicle can achieve given its speed on the road that it is traversing. Line 512 is associated with a right turn and line 513 is associated with a left turn. Line 514 represents the steering wheel slack angle variables. Note that the slack variable controlling steering to the left is set to zero between 2 and 6 seconds to penalize counter-steering. Line 516 shows the result of applying weight values to the desired maximum steering wheel angle. As can be seen, this solution does not generate a trucker turn because there is no positive steering wheel angle as the vehicle is performing the right turn. Since this plot represents a right turn, the left steering wheel angle is penalized by applying the weight values, and in this case, the slack variable is set to zero.

In one or more embodiments, an alternative way to mitigate trucker turns is to utilize a reference path. A reference path may be plotted in a way to increase the heading offset and lateral offset weights entering the corner. These weights control the optimization problem while tracking the reference path. Increasing the weights penalizes the AV from deviating from the reference path which may help mitigate trucker turns. However, in some cases, the reference path entering the corner may not be straight, resulting in a weaving behavior. Therefore, following the reference path may not fully mitigate trucker turns. On the other side, penalizing steering in the opposite direction of a turn while being independent of the reference path geometry presents a robust solution to this problem. It is understood that the above descriptions are for purposes of illustration and are not meant to be limiting.

Figure 6:
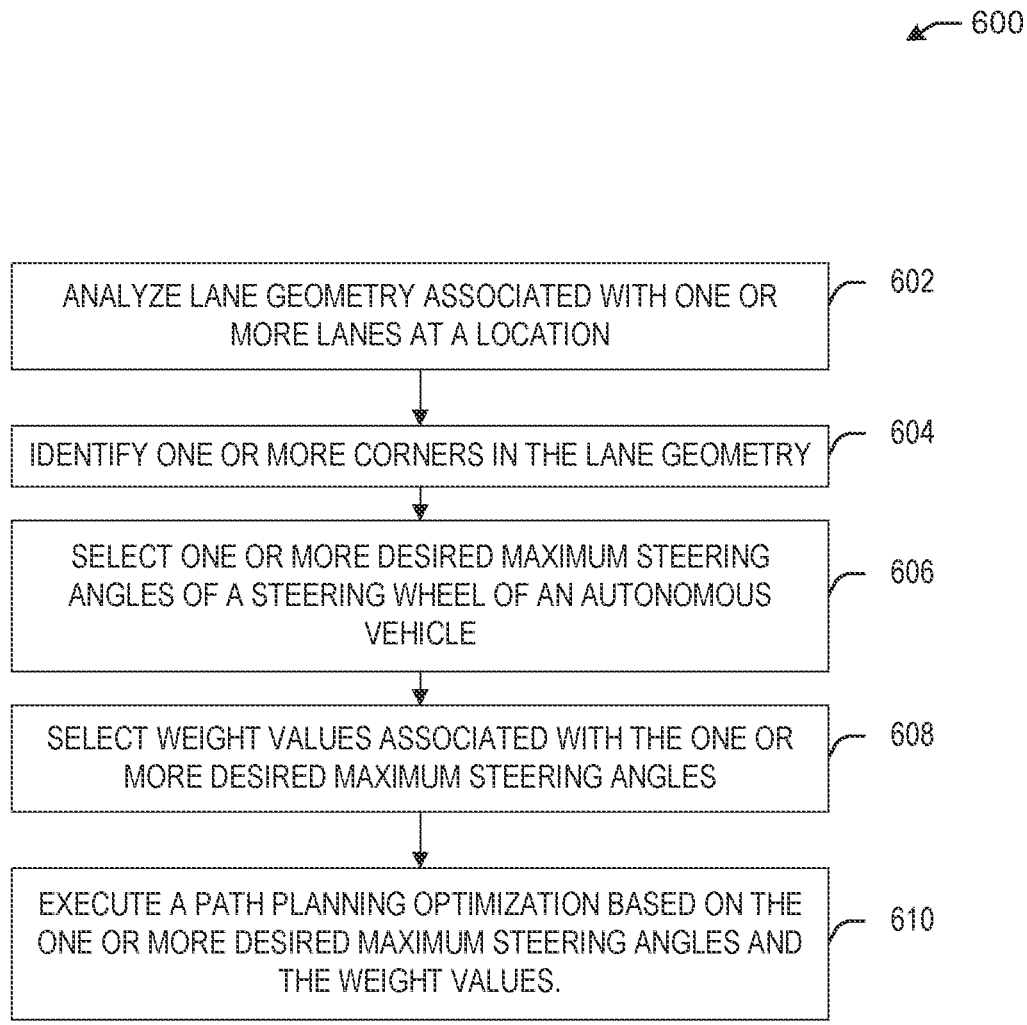
FIG. 6 illustrates a flow diagram of a process for an illustrative counter-steering penalization system, in accordance with one or more example embodiments of the present disclosure.

FIG. 6 illustrates a flow diagram of process 600 for an illustrative counter-steering penalization system, in accordance with one or more example embodiments of the present disclosure.

At block 602, a device may detect lane geometry associated with one or more lanes at a geographic location.

At block 604, the device may identify one or more corners in the lane geometry.

At block 606, the device may select one or more desired maximum steering angles of a steering wheel of an autonomous vehicle. The one or more desired maximum steering angles are associated with a time interval prior to a first corner of the one or more corners. The one or more desired maximum steering angles comprise a first desired maximum steering angle of a left turn and a second desired maximum steering angle of a right turn. The first desired maximum steering angle associated with the left turn is independent of the second desired maximum steering angle of the right turn.

At block 608, the device may select weight values associated with the one or more desired maximum steering angles. A steering angle of the steering wheel of the autonomous vehicle is less than the one or more desired maximum steering angles.

At block 610, the device may perform a path planning optimization based on the one or more desired maximum steering angles and the weight values. Performing the path planning optimization may comprise imposing a slack variable to control the path planning optimization. Performing the path planning optimization may comprise applying the weight values to penalize the one or more desired maximum steering angles. The slack value may be based on an avoidance path of an object in a region associated with a corner of the one or more corners. A positive steering wheel angle is associated with left movements on the steering wheel, and a negative steering wheel angle is associated with right movements on the steering wheel. A zero value of the weight values implies no penalty imposed on the desired maximum steering angles, and nonzero values of the weight values imply a penalty imposed on the desired maximum steering angles.

It is understood that the above descriptions are for purposes of illustration and are not meant to be limiting.

Figure 7:
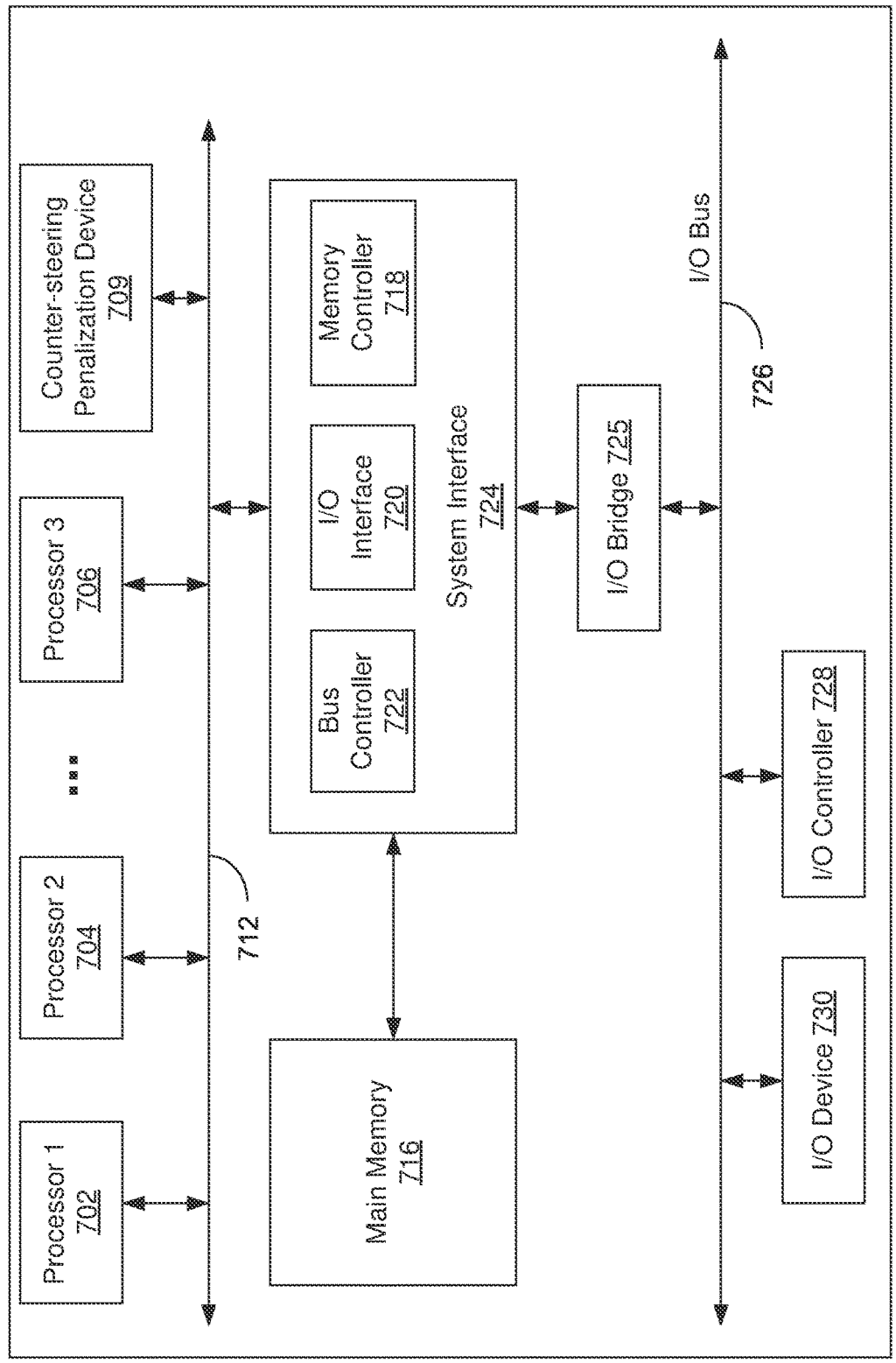
FIG. 7 is a block diagram illustrating an example of a computing device or computer system upon which any of one or more techniques (e.g., methods) may be performed, in accordance with one or more example embodiments of the present disclosure.

FIG. 7 is a block diagram illustrating an example of a computing device or computer system 700 upon which any of one or more techniques (e.g., methods) may be performed, in accordance with one or more example embodiments of the present disclosure.

For example, the computing system 700 of FIG. 7 may represent the one or more processor(s) 132 and/or the autonomous mode controller 135, and therefore, may assess and validate the sensors in the sensor system 110 of FIG. 1. The computer system (system) includes one or more processor(s) 702-706. Processor(s) 702-706 may include one or more internal levels of cache (not shown) and a bus controller (e.g., bus controller 722) or bus interface (e.g., I/O interface 720) unit to direct interaction with the processor bus 712. A counter-steering penalization device 709 may also be in communication with the Processors 702-706 and may be connected to the processor bus 712.

Processor bus 712, also known as the host bus or the front side bus, may be used to couple the processor(s) 702-706 and/or the counter-steering penalization device 709 with the system interface 724. System interface 724 may be connected to the processor bus 712 to interface other components of the system 700 with the processor bus 712. For example, system interface 724 may include a memory controller 718 for interfacing a main memory 716 with the processor bus 712. The main memory 716 typically includes one or more memory cards and a control circuit (not shown). System interface 724 may also include an input/output (I/O) interface 720 to interface one or more I/O bridge(s) 725 or I/O device(s) 730 with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processor(s) 702-706 and/or the counter-steering penalization device 709. Another type of user input device includes cursor control, such as a mouse, a trackball, or cursor direction keys for communicating direction information and command selections to the processors 702-706 and/or the counter-steering penalization device 709 and for controlling cursor movement on the display device.

System 700 may include a dynamic storage device, referred to as main memory 716, or a random access memory (RAM) or other computer-readable devices coupled to the processor bus 712 for storing information and instructions to be executed by the processor(s) 702-706 and/or the counter-steering penalization device 709. Main memory 716 also may be used for storing temporary variables or other intermediate information during execution of instructions by the processor(s) 702-706 and/or the counter-steering penalization device 709. System 700 may include read-only memory (ROM) and/or other static storage device coupled to the processor bus 712 for storing static information and instructions for the processor(s) 702-706 and/or the counter-steering penalization device 709. The system outlined in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processor(s) 702-706 and/or the counter-steering penalization device 709 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method. The method also includes detecting, by one or more processors, lane geometry associated with one or more lanes at a location. The method also includes identifying one or more corners in the lane geometry. The method also includes selecting one or more desired maximum steering angles of a steering wheel of an autonomous vehicle. The method also includes selecting weight values associated with the one or more desired maximum steering angles. The method also includes performing a path planning optimization based on the one or more desired maximum steering angles and the weight values. Other embodiments of this aspect include corresponding computer systems, apparatus, and computer programs recorded on one or more computer storage devices, each configured to perform the actions of the methods.

Implementations may include one or more of the following features. The method where the one or more desired maximum steering angles are associated with a time interval prior to a first corner of the one or more corners. The one or more desired maximum steering angles includes a first desired maximum steering angle of a left turn and a second desired maximum steering angle of a right turn. The first desired maximum steering angle associated with the left turn is independent of the second desired maximum steering angle of the right turn. Performing the path planning optimization includes applying the weight values to penalize the one or more desired maximum steering angles. A steering angle of the steering wheel of the autonomous vehicle is less than the one or more desired maximum steering angles. Performing the path planning optimization includes imposing a slack variable to control the path planning optimization. The slack value is based on an avoidance path of an object in a region associated with a corner of the one or more corners. A positive steering wheel angle is associated with left movements on the steering wheel, and a negative steering wheel angle is associated with right movements on the steering wheel. A zero value of the weight values implies no penalty imposed on the desired maximum steering angles and nonzero values of the weight values imply a penalty imposed on the desired maximum steering angles. Implementations of the described techniques may include hardware, a method or process, or computer software on a computer-accessible medium.

One general aspect includes a non-transitory computer-readable medium storing computer-executable instructions. The non-transitory computer-readable medium storing computer-executable instructions also includes detecting lane geometry associated with one or more lanes at a location. The non-transitory computer-readable medium storing computer-executable instructions also includes identifying one or more corners in the lane geometry. The non-transitory computer-readable medium storing computer-executable instructions also includes selecting one or more desired maximum steering angles of a steering wheel of an autonomous vehicle. The non-transitory computer-readable medium storing computer-executable instructions also includes selecting weight values associated with the one or more desired maximum steering angles. The non-transitory computer-readable medium storing computer-executable instructions also includes performing a path planning optimization based on the one or more desired maximum steering angles and the weight values. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the one or more desired maximum steering angles are associated with a time interval prior to a first corner of the one or more corners. The one or more desired maximum steering angles includes a first desired maximum steering angle of a left turn and a second desired maximum steering angle of a right turn. The first desired maximum steering angle associated with the left turn, is independent of the second desired maximum steering angle of the right turn. To perform the path planning optimization further includes applying the weight values to penalize the one or more desired maximum steering angles. A steering angle of the steering wheel of the autonomous vehicle is less than the one or more desired maximum steering angles. To perform the path planning optimization further includes imposing a slack variable to control the path planning optimization. Implementations of the described techniques may include hardware, a method or process, or computer software on a computer-accessible medium.

One general aspect includes a system for controlling an operation of an autonomous vehicle. The system also includes a global positioning system sensor. The system also includes a memory device. The system also includes one or more autonomous driving sensors. The system also includes an autonomous mode controller to: determine a geographic location of the autonomous vehicle via the global positioning system sensor, analyze lane geometry associated with one or more lanes at the geographic location, identify one or more corners in the lane geometry, select one or more desired maximum steering angles of a steering wheel of an autonomous vehicle, select weight values from the memory device associated with the one or more desired maximum steering angles, and execute a path planning optimization based on the one or more desired maximum steering angles and the weight values. Other embodiments of this aspect include corresponding computer systems, apparatus, and computer programs recorded on one or more computer storage devices, each configured to perform the actions of the methods.

Implementations may include one or more of the following features. The system where the one or more desired maximum steering angles are associated with a time interval prior to a first corner of the one or more corners. The one or more desired maximum steering angles includes a first desired maximum steering angle of a left turn and a second desired maximum steering angle of a right turn. Implementations of the described techniques may include hardware, a method or process, or computer software on a computer-accessible medium.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 716, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   detecting, by one or more processors, lane geometry associated with one or more lanes at a location;
   identifying one or more corners in the lane geometry;

selecting one or more desired maximum steering angles of a steering wheel of an autonomous vehicle;

selecting one or more weight values associated with the one or more desired maximum steering angles; and performing a path planning optimization to select a steering wheel angle as a function of time or distance wherein an objective function of the optimization penalizes, based on the one or more weight values, steering wheel angles that exceed, in absolute value, one or more of the desired maximum steering angles.

2. The method of claim 1, wherein the one or more desired maximum steering angles are associated with a time interval prior to a first corner of the one or more corners.

3. The method of claim 1, wherein the one or more desired maximum steering angles comprises a first desired maximum steering angle of a left turn and a second desired maximum steering angle of a right turn.

4. The method of claim 3, wherein the first desired maximum steering angle associated with the left turn is independent of the second desired maximum steering angle of the right turn.

5. The method of claim 1, wherein performing the path planning optimization comprises imposing a slack variable to control the path planning optimization.

6. The method of claim 5, wherein the slack value is based on an avoidance path of an object in a region associated with a corner of the one or more corners.

7. The method of claim 1, wherein a positive steering wheel angle is associated with left movements on the steering wheel, and a negative steering wheel angle is associated with right movements on the steering wheel.

8. A non-transitory computer-readable medium storing computer-executable instructions, which when executed by one or more processors result in performing operations comprising:

detecting lane geometry associated with one or more lanes at a location;

identifying one or more corners in the lane geometry;

selecting one or more desired maximum steering angles of a steering wheel of an autonomous vehicle;

selecting one or more weight values associated with the one or more desired maximum steering angles; and performing a path planning optimization to select a steering wheel angle as a function of time wherein an objective function of the optimization penalizes, one or more weight values, steering wheel angles that exceed, in absolute value, one or more of the desired maximum steering angles.

9. The non-transitory computer-readable medium of claim 8, wherein the one or more desired maximum steering angles are associated with a time interval prior to a first corner of the one or more corners.

10. The non-transitory computer-readable medium of claim 8, wherein the one or more desired maximum steering angles comprises a first desired maximum steering angle of a left turn and a second desired maximum steering angle of a right turn.

11. The non-transitory computer-readable medium of claim 10, wherein the first desired maximum steering angle associated with the left turn, is independent of the second desired maximum steering angle of the right turn.

12. The non-transitory computer-readable medium of claim 8, wherein to perform the path planning optimization further comprises applying the weight values to penalize the one or more desired maximum steering angles.

13. The non-transitory computer-readable medium of claim 8, wherein a steering angle of the steering wheel of the autonomous vehicle is less than the one or more desired maximum steering angles.

14. The non-transitory computer-readable medium of claim 8, wherein to perform the path planning optimization further comprises imposing a slack variable to control the path planning optimization.

15. A system for controlling an operation of an autonomous vehicle, the system comprising:

a global positioning system sensor;
a memory device;
one or more autonomous driving sensors; and
an autonomous mode controller to:

determine a geographic location of the autonomous vehicle via the global positioning system sensor;

analyze lane geometry associated with one or more lanes at the geographic location;

identify one or more corners in the lane geometry;

select one or more desired maximum steering angles of a steering wheel of an autonomous vehicle;

select one or more weight values from the memory device associated with the one or more desired maximum steering angles; and execute a path planning optimization to select a steering wheel angle as a function of time or distance wherein an objective function of the optimization penalizes, based on the one or more weight values, steering wheel angles that exceed, in absolute value, one or more of the desired maximum steering angles.

16. The system of claim 15, wherein the one or more desired maximum steering angles are associated with a time interval prior to a first corner of the one or more corners.

17. The system of claim 15, wherein the one or more desired maximum steering angles comprises a first desired maximum steering angle of a left turn and a second desired maximum steering angle of a right turn.

18. The method of claim 1, wherein the one or more weights are based on the presence of obstacles.

19. The non-transitory computer-readable medium of claim 8, wherein the one or more weights are based on the presence of obstacles.

20. The system of claim 15, wherein the one or more weights are based on the presence of obstacles.

* * * * *